United States Patent
Moestam et al.

(10) Patent No.: US 10,683,040 B2
(45) Date of Patent: Jun. 16, 2020

(54) WATER SEPARATION IN WHEEL HOUSES

(71) Applicant: Ningbo Geely Automobile Research & Development Co., Ltd., Ningbo (CN)

(72) Inventors: Robert Moestam, Växjö (SE); Jari Kesti, Västra Frölunda (SE); Rikard Rigdal, Göteborg (SE)

(*) Notice: Subject to any disclaimer, the term of this patent is extended or adjusted under 35 U.S.C. 154(b) by 0 days.

(21) Appl. No.: 16/095,802

(22) PCT Filed: Apr. 27, 2017

(86) PCT No.: PCT/EP2017/060029
§ 371 (c)(1),
(2) Date: Oct. 23, 2018

(87) PCT Pub. No.: WO2017/186837
PCT Pub. Date: Nov. 2, 2017

(65) Prior Publication Data
US 2019/0126990 A1 May 2, 2019

(30) Foreign Application Priority Data
Apr. 27, 2016 (EP) .................... 16167307

(51) Int. Cl.
*B62D 25/16* (2006.01)
*B62D 25/18* (2006.01)
*B60R 13/08* (2006.01)

(52) U.S. Cl.
CPC .......... *B62D 25/161* (2013.01); *B62D 25/18* (2013.01); *B60R 13/0861* (2013.01)

(58) Field of Classification Search
CPC .... B62D 25/161; B62D 25/18; B60R 13/0861
See application file for complete search history.

(56) References Cited

U.S. PATENT DOCUMENTS

| 7,017,707 | B2* | 3/2006 | Zia | ............ F01N 1/02 181/250 |
| 2003/0160472 | A1* | 8/2003 | Xia | ........ B60K 13/02 296/65.09 |
| 2003/0221905 | A1* | 12/2003 | Xia | ........ B60K 11/04 181/224 |

(Continued)

FOREIGN PATENT DOCUMENTS

| DE | 20100396 U1 | 3/2011 |
| EP | 2865571 A2 | 4/2015 |

(Continued)

OTHER PUBLICATIONS

International Search Report and Written Opinion from corresponding International Patent Application No. PCT/EP2017/060029, dated Aug. 8, 2017, 11 pages.

(Continued)

*Primary Examiner* — Erez Gurari
(74) *Attorney, Agent, or Firm* — Tucker Ellis LLP

(57) ABSTRACT

An arrangement (10) in a wheel well (2) of a vehicle (1), comprising at least one passage (11) providing fluid communication between an engine compartment (3) and the wheel well to permit airflow there through, wherein the passage is non-straight in order to prevent ingress of water into the engine compartment. Also disclosed is a vehicle comprising such an arrangement.

11 Claims, 2 Drawing Sheets

(56) References Cited

U.S. PATENT DOCUMENTS

2016/0059689 A1* 3/2016 Girondi ............... B60K 13/02
  180/68.1

FOREIGN PATENT DOCUMENTS

| | | |
|---|---|---|
| GB | 2385567 A | 8/2003 |
| GB | 2510898 A | 8/2014 |
| JP | 2013203096 A | 10/2013 |
| WO | 2010090241 A1 | 8/2010 |
| WO | 2013016867 A1 | 2/2013 |

OTHER PUBLICATIONS

Extended Search Report from corresponding European Patent Application No. 16167307.4, dated Nov. 18, 2016, 7 pages.

* cited by examiner

WATER SEPARATION IN WHEEL HOUSES

TECHNICAL FIELD

The present invention relates generally to devices and methods for permitting airflow out from an engine compartment to a wheel well whilst preventing ingress of water in the opposite direction.

BACKGROUND ART

Engines in automotive vehicles generate considerable heat when operated, which needs to be dissipated from the engine compartment to maintain optimal performance and operating regime with respect to temperature. Traditionally, this problem was solved by providing large openings in the chassis, but this has the disadvantages of deteriorating aerodynamic properties of the vehicle as well as exposing the engine compartment to external debris and moisture. Instead, smaller openings are provided e.g. in the wheel houses of the vehicle to evacuate hot air from the engine compartment. However, when driving in wet conditions or through water, mud and water will splash in through the openings. In order to counteract this effect, blocking splash screens are introduced, but this leads to a considerable reduction of airflow, which in turn decreases heat dissipation from the engine compartment.

GB 2510898 discloses an arrangement provided with apertures in a stepped ladder configuration to permit airflow through the arrangement between an engine compartment and the wheel cavity.

WO 2013/016867 discloses a protective cover for a vehicle comprising channels for fluid communication between first and second openings offset with respect to each other to enable heat dissipation from an engine.

However, none of the cited prior art documents provide an optimal balance between airflow and splash protection. Thus, there is a need to develop improved solutions for allowing airflow out from the engine compartment whilst preventing ingress of water and moisture contamination.

SUMMARY OF INVENTION

An object of the present invention is to provide an improved solution for a wheel well in a vehicle which prevents ingress of water into the engine compartment whilst allowing airflow out from the engine compartment. This object is achieved in a first aspect of the invention by an arrangement in a wheel well of a vehicle, comprising at least one passage providing fluid communication between an engine compartment and the wheel well to permit airflow there through, wherein the passage is non-straight in order to prevent ingress of water into the engine compartment. The non-straight passage takes advantage of the comparably high inertia of water over air such that water entering the passage will impinge on the surfaces of the passage and be prevented from reaching the engine compartment. At the same time, air with considerably lower inertia will pass in the opposite direction through the passage to dissipate heat from the engine compartment. Thereby, an optimal balance between splash protection and heat dissipation is achieved.

In a preferred embodiment, the passage is delimited by two walls defining the non-straight passage, wherein the walls each comprise at least two wall sections delimiting an upstream portion and a downstream portion of the passage with respect to the direction of airflow through the passage, such that at least one change of direction is provided between the upstream portion and the downstream portion. By arranging the upstream and the downstream portions such that at least one change of direction of the passage is obtained, i.e. at an angle to each other, a simple yet effective solution for creating a non-straight, tortuous passage is achieved.

In a preferred embodiment, the wall sections extend in a direction substantially perpendicular to the direction of airflow through the passage. The extension of the wall sections substantially perpendicular to the direction of airflow through the passage contributes to increasing the cross-sectional area of the passage and thereby the airflow without further exposing the engine compartment to ingress of water and moisture.

In an advantageous embodiment, the wall sections are arranged substantially vertical to allow water to drain by gravity. The vertical orientation of the wall sections is a simple solution to remove impinging water without requiring additional ducts and conduits.

In an alternative embodiment, the wall sections are non-planar and curved to form a smooth transition between the upstream portion and the downstream portion. The curved, non-planar shape of the wall sections create a more streamlined, meandering shape of the passage to promote airflow whilst still providing an effective barrier to impinging water.

In a preferred embodiment, each wall comprises at least one protruding edge oriented toward the downstream portion. The protruding edges are oriented toward the downstream portion of the passage and arranged at an oblique angle in order to provide an additional obstacle to impinging water whilst only affecting the airflow in the opposite direction to a small degree.

In an alternative embodiment, the wall sections are substantially planar and arranged substantially perpendicular to each other. The substantially perpendicular arrangement of the wall sections in relation to each other provides another compact and effective solution for the non-straight passage to maintain sufficient airflow velocity whilst preventing ingress of water.

In a further preferred embodiment, each wall comprises a plurality of wall sections, wherein adjacent wall sections are arranged substantially perpendicular to each other in an alternating pattern to form a zigzag shaped passage. The plurality of wall sections lengthens the passage by creating additional turns in a zig-zag pattern to further obstruct ingress of water whilst not deteriorating airflow in the opposite direction out from the engine compartment.

In an advantageous embodiment, the wall sections are arranged at an oblique angle with respect to the incoming direction of airflow from the engine compartment. By making the angle between the incoming direction of airflow from the engine compartment and the wall sections oblique, i.e. they are neither parallel nor at right angles with each other, the detrimental effect on the airflow velocity is minimal to avoid turbulence and backflow. Preferably, the angle between the wall sections and the direction of airflow from the engine compartment is in the range 30°-60°, preferably 40°-50°, most preferably around 45°.

In an alternative embodiment, a first upstream wall section extends over an adjacent second downstream wall section, in the direction of airflow through the passage, to form a protruding edge. The protruding edge of the upstream wall section forms an additional barrier for the water, thereby further obstructing ingress of water whilst not deteriorating airflow in the opposite direction out from the engine compartment.

In an alternative embodiment, the arrangement comprises a plurality of passages arranged side by side. By providing a plurality of passages, the total cross-sectional area, and thereby the airflow, is increased in a compact construction without further exposing the engine compartment to ingress of water and moisture.

In a second aspect of the present invention, there is provided a vehicle comprising at least one arrangement according to the first aspect.

In a preferred embodiment, the arrangement is arranged in a wheel well of the vehicle at an angle to the wheel axle. The angle may be chosen such that the arrangement is parallel or perpendicular to the wheel axle, or any angle there between. The orientation of the passage is chosen to optimise the airflow out of the engine compartment.

In an alternative embodiment, the arrangement is arranged in an engine compartment of the vehicle near an opening to a wheel well. The placement inside the engine compartment further protects the engine in that the water must travel further from the wheel well and loses momentum along the way.

BRIEF DESCRIPTION OF DRAWINGS

The invention is now described, by way of example, with reference to the accompanying drawings, in which:

FIG. 2 shows a cross-sectional view of an arrangement according to the present invention, perpendicular to the direction of fluid flow there through;

DESCRIPTION OF EMBODIMENTS

Figure 1:
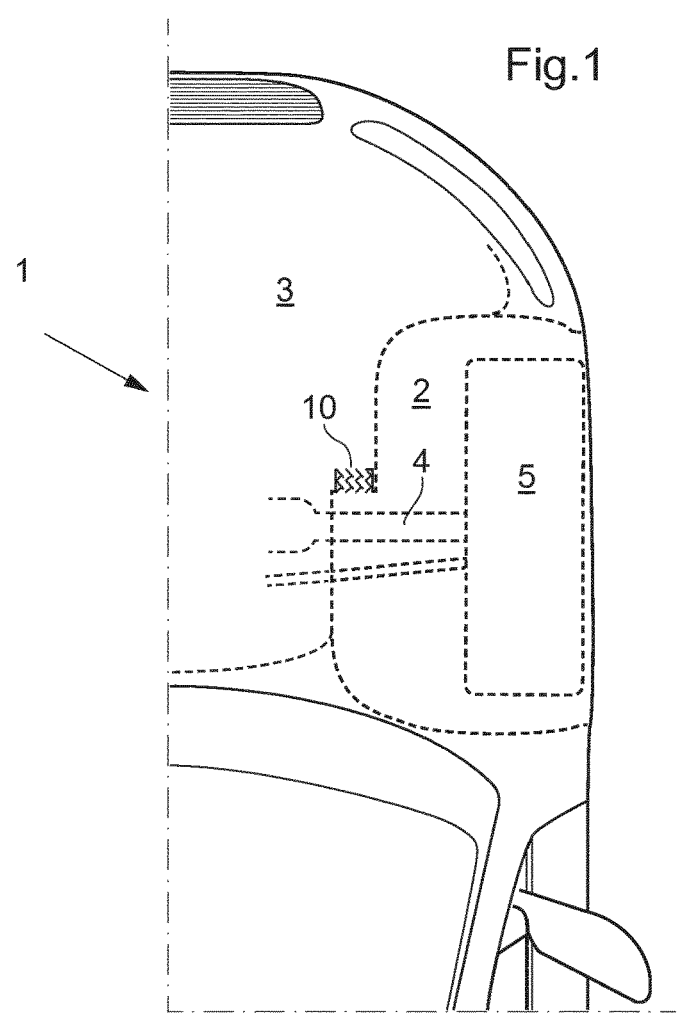
FIG. 1 shows a top view of a wheel well in a vehicle, including an arrangement ac- cording to the present invention.

In the following, a detailed description of an arrangement according to the present invention is presented. In the drawing figures, like reference numerals designate identical or corresponding elements throughout the several figures. It will be appreciated that these figures are for illustration only and are not in any way restricting the scope of the invention.

Shown in FIG. 1 is a section illustrating a front portion of a vehicle 1 seen from above. In hatched lines, the right front wheel well 2 of the vehicle 1 is outlined, including the wheel 5 and the wheel axle 4. On the left hand side of FIG. 1 is the engine compartment 3 and in an interfacial region between the engine compartment 3 and the wheel well 2 there is provided an arrangement 10 for permitting airflow between the two.

The arrangement 10 comprises at least one non-straight, tortuous passage 11 between the engine compartment 3 and the wheel well 2 to enable airflow out of the engine compartment 3 to dissipate heat. The low inertia of air allows the air to change direction in the passage 11 without considerably affecting or deteriorating the speed of airflow. Travelling in the opposite direction is water and mud with higher density and inertia than air. The water will impinge on the surfaces of the passage 11 and decelerate to a much higher degree than air. Thus, the non-straight passage 11 protects against splashing of mud and water into the engine compartment 3 whilst allowing hot air to exit the engine compartment 3. In other words, the arrangement 10 acts as a separator or separating arrangement for separating water and air flowing in opposite directions through the passage 11.

Figure 2:
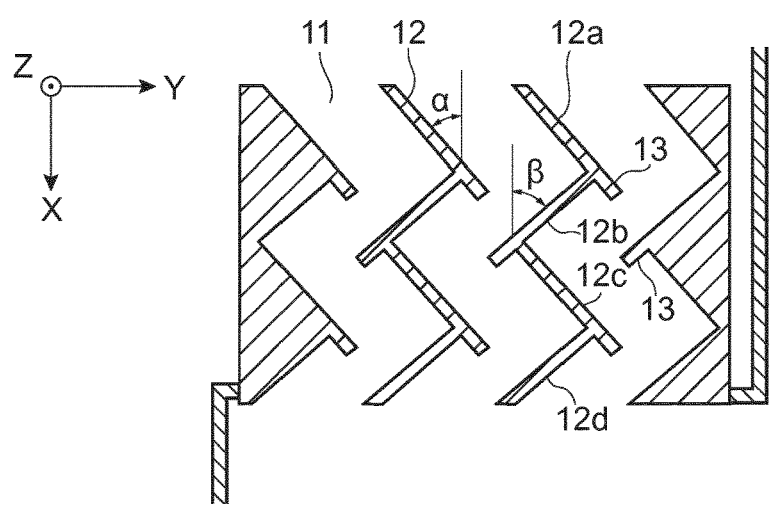
Figure 3:
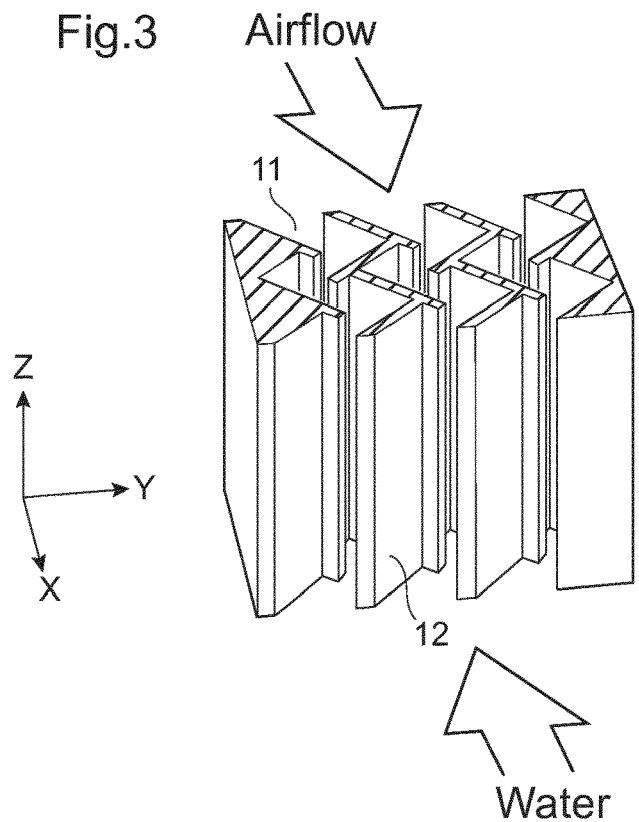
FIG. 3 shows a perspective view of an arrangement according to the present invention, illustrating the opposite flow directions of air and water.

Looking now at FIGS. 2 and 3, a cross-sectional and a perspective view of a first embodiment of the arrangement 10 of the present invention are shown, respectively. Here, three non-straight passages 11, herein also described as channels or flow paths, are illustrated side by side, but any suitable number of passages 11 is foreseen within the scope of the invention. A higher number of passages 11 allows for increased airflow out from the engine compartment 3. The passages 11 extend in a generally longitudinal direction along an x-axis as defined by the coordinate system shown in FIG. 2. Furthermore, the width of each passage 11 extends in a generally lateral direction along a y-axis, and the height extends in a generally vertical direction along a z-axis (directed out from the plane of the drawing). However, the z-axis can also be inclined with respect to the vertical direction. The length of each passage 11 along the x-axis may be in the range from 30 mm to 200 mm, the width may be in the range from 10 mm to 200 mm and the height may be in the range from 30 mm to the entire height of the wheel well 2.

Each passage 11 is delimited by two non-straight walls 12, each comprising at least two adjacent wall sections 12a, 12b. The wall sections 12a, 12b are arranged substantially perpendicular to each other such that a non-straight passage 11 or flow path is formed. In FIGS. 2 and 3, the wall sections 12a, 12b are shown to be substantially planar and perpendicular to each other, giving a right angle turn of the passage. In the case of more than one passage 11, the wall 12 of one passage 11 also forms a wall 12 of the adjacent passage 11. The perpendicular wall sections 12a, 12b form at least one right-angle turn in the passage 11, thus giving at least one directional change for the fluids to navigate in order to traverse the passage 11. As explained above, the water will impinge on the surfaces of the perpendicular wall sections 12a, 12b and be prevented from entering the engine compartment 3. Airflow out from the engine compartment 3 will only be marginally affected by the right-angle turn.

Each wall 12 may comprise a plurality of wall sections 12a, 12b, 12c, 12d arranged substantially perpendicular to each other in an alternating pattern to create a zigzag shaped passage 11 as shown in FIGS. 2 and 3. The zigzag shape of the passage 11 creates several right-angle turns in alternating left-right directions ensuring that the impinging water loses all momentum, thereby preventing ingress of water into the engine compartment 3. However, the number of wall sections 12a, 12b may be lower as long as at least one change of direction is provided.

As seen in FIG. 3, the airflow out from the engine compartment 3 is in the opposite direction of water splashing e.g. from the wheel. In order to minimize the effect on the airflow out from the engine compartment 3, the wall sections 12a, 12b, 12c, 12d are arranged at an oblique angle to the initial incoming direction of the airflow into the passage 11 along the x-axis. In other words, the wall sections 12a, 12b, 12c, 12d are neither parallel with nor at right angles to the x-axis. Thereby, the first wall section encountered by the airflow on its path from the engine compartment 3 through the passage 11 into the wheel well 2 is oblique to the initial (and general) airflow direction. A perpendicular surface creates turbulence and backflow to reduce the overall airflow, and is therefore best avoided at the point of entry into the passage 11. Since the wall sections 12a, 12b, 12c, 12d are arranged substantially perpendicular to each other, this implies that all wall sections 12a, 12b, 12c, 12d will be oblique with respect to the direction of airflow from the engine compartment 3. As an example, the angle α between the first wall section and the direction of airflow could be 30°, making the angle ß between the second wall section and the direction of airflow 60°. Ideally, the angle between the wall sections 12a, 12b, 12c, 12d and the direction of airflow out from the engine compartment 3 is in the range 30°-60°, such as e.g. 40°-50°. An optimal value of the angle α (and thus also ß) is around 45°.

In order to further prevent ingress of water the wall sections 12a, 12b, 12c, 12d may be provided with protruding edges 13. As shown in FIGS. 2 and 3, a first wall section 12a located upstream of an adjacent second wall section 12b, in the direction of airflow from the engine compartment 3 through the passage, protrudes over the second wall section 12b to form an edge. This protruding edge 13 then forms an additional obstacle to the impinging water while only negligibly affecting the airflow in the opposite direction. Every wall section 12a; 12b; 12c located upstream of an adjacent wall section 12b; 12c; 12d may be arranged to protrude to form a plurality of protruding edges 13.

As may be further seen in FIG. 3, the wall sections 12a, 12b, 12c, 12d and thus, the walls 12 of the passage 11 extend in a direction along the z-axis, perpendicular to the direction of airflow from the engine compartment 3 along the x-axis. This extension brings a further dimension to the non-straight passage 11, e.g. along the z-axis, to increase the cross-sectional area of the passage 11. Thereby, a higher rate of airflow from the engine compartment 3 can be achieved whilst maintaining the splash protection against incoming water. In order to further improve the function of the non-straight passage 11, the wall sections 12a, 12b, 12c, 12d are arranged substantially vertical or inclined to the vertical direction to allow water to drain off by gravity. The passage 11 may then also be open or have openings downward to let the water drain there through. Alternatively, a bottom portion of the arrangement 10 may be arranged slanting downward in a direction from the engine compartment 3 toward the wheel well 2. Thereby a simple and efficient design construction is achieved without requiring additional components such as conduits or ducts to lead impinging water away.

Figure 4:
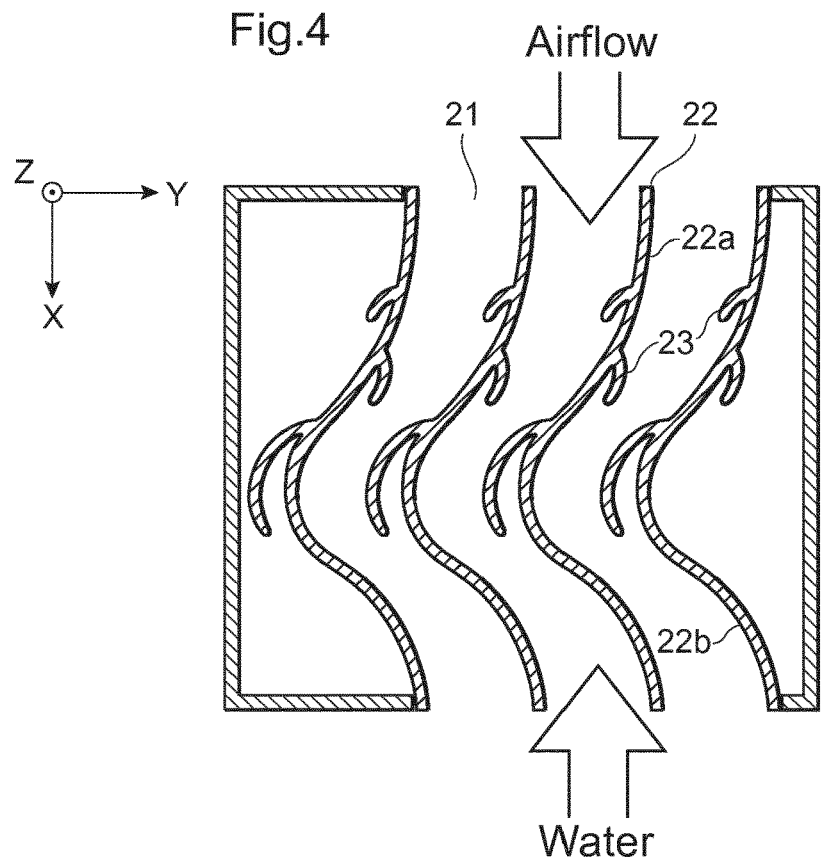
FIG. 4 shows a perspective view of an arrangement according to the present invention, illustrating walls which are curved and nonplanar.

In an alternative embodiment, a non-straight passage 21 is shown in FIG. 4, wherein the walls 22 are curved and non-planar with an upstream wall section 22a and a downstream wall section 22b to create a more streamlined, meandering S-shape of the passage 21 instead of the zigzag shape created by the perpendicular wall sections 12a, 12b illustrated in FIGS. 2 and 3. The overall shape of the alternative passage 21 is similar to the passage 11 described above with the right-angled turns, generally describing a substantially 90° bend but with a smoother transition enabled by the curved shape of the walls 22. Additionally, protruding edges 23 may be formed in the walls 22 and angled in a downstream orientation with respect to the direction of airflow along the x-axis from the engine compartment through the passage 21. The protruding edges 23 serve the same purpose as protruding edges 13, namely providing an additional obstacles to impinging water whilst only minimally affecting the airflow in the opposite direction.

In FIG. 1, the arrangement 10 is shown in a configuration arranged substantially perpendicular to the wheel axle 4. However, the orientation of the passages 11 may be chosen to any angle with respect to the wheel axle 4 to provide optimal conditions for airflow and heat dissipation out from the engine compartment 3. Additionally, the location of the arrangement 10 need not be confined to the interface between the wheel well 2 and the engine compartment 3. The arrangement 10 may instead me located inside the engine compartment 3 near an opening (not shown) to the wheel well 2. It is also foreseen to provide one or more arrangements 10 in or near one or two of the wheel wells 2 in fluid communication with the engine compartment 3. The placement of the arrangements 10 in the respective left and right wheel wells 2 may be symmetrical or non-symmetrical to account for differences and optimize airflow out of the engine compartment 3. Splashing and spray from the wheel 5 during driving is more prominent in the rear portion of the wheel well 2, since this is the first portion of the wheel well 2 faced by the wheel 5 after leaving contact with the road. Therefore, it is preferred to place the arrangement 10 in or near a front portion of the wheel well 2.

The invention claimed is:

1. An arrangement in or near a wheel well of a vehicle, comprising at least one passage providing fluid communication between an engine compartment and the wheel well to permit airflow out of the engine compartment to dissipate heat, wherein the at least one passage is non-straight in order to prevent ingress of water into the engine compartment, wherein the at least one passage is delimited by two walls defining the non-straight passage, wherein the walls each comprise at least two wall sections delimiting an upstream portion and a downstream portion of the passage with respect to the direction of airflow through the passage, such that at least one change of direction is provided between the upstream portion and the downstream portion; and
    wherein the wall sections are arranged at an oblique angle with respect to the direction of airflow from the engine compartment.

2. The arrangement according to claim 1, wherein the wall sections are non-planar and curved to form a smooth transition between the upstream portion and the downstream portion.

3. The arrangement according to claim 1, wherein the wall sections are substantially planar and arranged substantially perpendicular to each other.

4. The arrangement according to claim 1, wherein the angle between the wall sections and the direction of airflow from the engine compartment is in the range 30°- 60°, preferably 40°- 50°, most preferably around 45°.

5. The arrangement according to claim 1, comprising a plurality of passages arranged side by side.

6. A vehicle comprising at least one arrangement according to claim 1.

7. The vehicle according to claim 6, wherein the arrangement is arranged in a wheel well of the vehicle at an angle to a wheel axle.

8. The vehicle according to claim 6, wherein the arrangement is arranged in an engine compartment of the vehicle near an opening to a wheel well.

9. An arrangement in or near a wheel well of a vehicle, comprising at least one passage providing fluid communication between an engine compartment and the wheel well to permit airflow out of the engine compartment to dissipate heat, wherein the at least one passage is non-straight in order to prevent ingress of water into the engine compartment, wherein the at least one passage is delimited by two walls defining the non-straight passage, wherein the walls each comprise at least two wall sections delimiting an upstream portion and a downstream portion of the passage with respect to the direction of airflow through the passage, such that at least one change of direction is provided between the upstream portion and the downstream portion; and
   wherein the wall sections are non-planar and curved to form a smooth transition between the upstream portion and the downstream portion; and
   wherein each wall comprises at least one protruding edge oriented toward the downstream portion.

10. An arrangement in or near a wheel well of a vehicle, comprising at least one passage providing fluid communication between an engine compartment and the wheel well to permit airflow out of the engine compartment to dissipate heat, wherein the at least one passage is non-straight in order to prevent ingress of water into the engine compartment, wherein the at least one passage is delimited by two walls defining the non-straight passage, wherein the walls each comprise at least two wall sections delimiting an upstream portion and a downstream portion of the passage with respect to the direction of airflow through the passage, such that at least one change of direction is provided between the upstream portion and the downstream portion; and
   wherein the wall sections are substantially planar and arranged substantially perpendicular to each other; and
   wherein each wall comprises a plurality of wall sections, wherein adjacent wall sections are arranged substantially perpendicular to each other in an alternating pattern to form a zigzag shaped passage.

11. The arrangement according to claim 10, wherein a first upstream wall section, extends over an adjacent second downstream wall section in the direction of airflow through the passage, to form a protruding edge.

* * * * *